US009392255B2

(12) United States Patent
Kim et al.

(10) Patent No.: US 9,392,255 B2
(45) Date of Patent: Jul. 12, 2016

(54) APPARATUS AND METHOD FOR 3D BROADCASTING SERVICE IN BROADCASTING SYSTEM COMBINED WITH MOBILE BROADCASTING

(75) Inventors: Sung-Hoon Kim, Daejeon (KR); Chung Hyun Ahn, Daejeon (KR); Sukhee Cho, Daejeon (KR); Jin Woong Kim, Daejeon (KR); Jin Soo Choi, Daejeon (KR); Jin Woo Hong, Daejeon (KR)

(73) Assignee: Electronics and Telecommunication Research Institute, Daejeon (KR)

( * ) Notice: Subject to any disclaimer, the term of this patent is extended or adjusted under 35 U.S.C. 154(b) by 521 days.

(21) Appl. No.: 13/513,728

(22) PCT Filed: Nov. 23, 2010

(86) PCT No.: PCT/KR2010/008263
§ 371 (c)(1),
(2), (4) Date: Jun. 4, 2012

(87) PCT Pub. No.: WO2011/068318
PCT Pub. Date: Jun. 9, 2011

(65) Prior Publication Data
US 2012/0257015 A1 Oct. 11, 2012

(30) Foreign Application Priority Data

Dec. 4, 2009 (KR) .................. 10-2009-0119541
Apr. 12, 2010 (KR) .................. 10-2010-0033227

(51) Int. Cl.
*H04N 13/00* (2006.01)
*H04H 20/95* (2008.01)
(Continued)

(52) U.S. Cl.
CPC .......... *H04N 13/0059* (2013.01); *H04H 20/95* (2013.01); *H04N 21/236* (2013.01); *H04N 21/434* (2013.01)

(58) Field of Classification Search
CPC ............ H04N 13/0056; H04N 21/236; H04N 21/434; H04H 20/95
See application file for complete search history.

(56) References Cited

U.S. PATENT DOCUMENTS

2009/0055871 A1* 2/2009 Song et al. ............... 725/54
2009/0066785 A1* 3/2009 Lee ...................... 348/51
(Continued)

FOREIGN PATENT DOCUMENTS

JP 2008500790 A 1/2008
JP 2008524943 A 7/2008
(Continued)

OTHER PUBLICATIONS

Hyun Lee et al., A Structure for 2D/3D Mixed Service Based on Terrestrial DMB System, 4 pages, Electronics and Telecommunications Research Institute, Daejeon, Republic of Korea.

*Primary Examiner* — Thai Tran
*Assistant Examiner* — Christopher T Braniff
(74) *Attorney, Agent, or Firm* — William Park & Associates Ltd.

(57) ABSTRACT

Provided is an apparatus and a method for providing a three-dimensional (3D) broadcasting service that may provide a two-dimensional (2D) fixed broadcasting service using a fixed broadcasting signal or a 2D mobile broadcasting service using a mobile broadcasting signal when a transmitter transmits each of a left image and a right image constituting a 3D image using the fixed broadcasting signal or the mobile broadcasting signal, and the receiver receives the fixed broadcasting signal and the mobile broadcasting signal, or may provide a 3D broadcasting service by composing an image received using the fixed broadcasting signal and an image received using the mobile broadcasting signal into a 3D image.

5 Claims, 2 Drawing Sheets

(51) Int. Cl.
*H04N 21/236* (2011.01)
*H04N 21/434* (2011.01)

(56) References Cited

U.S. PATENT DOCUMENTS

2009/0257452 A1 10/2009 Lee et al.
2010/0091091 A1 4/2010 Kim
2010/0141738 A1 6/2010 Lee et al.

FOREIGN PATENT DOCUMENTS

| KR | 1020050111379 A | 11/2005 |
| KR | 1020060054872 A | 5/2006 |
| WO | 2006016735 A1 | 2/2006 |
| WO | 2007067020 A1 | 6/2007 |
| WO | WO2008038961 * | 4/2008 |

* cited by examiner

APPARATUS AND METHOD FOR 3D BROADCASTING SERVICE IN BROADCASTING SYSTEM COMBINED WITH MOBILE BROADCASTING

TECHNICAL FIELD

The present invention relates to an apparatus and a method for providing a three-dimensional (3D) broadcasting service, and more particularly, to an apparatus and a method for a 3D broadcasting service that may provide a 3D broadcasting service in a broadcasting system where a fixed broadcasting service and a mobile broadcasting service are combined.

BACKGROUND ART

The Advance Television Systems Committee (ATSC), a standard for a terrestrial broadcasting in the United States, is a Radio Frequency (RF) standard which supports an 8-Vestigial Side Band (8-VSB) mode for providing a fixed broadcasting service and which supports a Mobile/Handheld (M/H) mode for providing a mobile broadcasting service. The 8-VSB mode and the M/H mode have a concept of an in-band mobile broadcasting that enables to broadcast different contents by respectively introducing a concept of a virtual channel and a concept of a time-share transmission in a single physical channel, for example, a 6 MHz single channel. That is, a band for a data transmission is shared respectively by the 8-VSB for a fixed receiving service within an overall data transmission rate of 19.39 Mbps and by the M/H for a mobile/portable receiving service, and a combination rate of the 8-VSB and the M/H is adjustable variably by setting a mode.

As described above, the 8-VSB mode and the M/H mode are both operated independently. In order to perform a three-dimensional (3D) broadcasting service in this transmission circumstance, it is required to insert a separate data stream necessary for a 3D composition into each of the 8-VSB and the M/H. Consequently, this repeated data insertion decreases an overall data transmission rate and degrades a quality of a service image.

DISCLOSURE OF INVENTION

Technical Goals

An aspect of the present invention provides an apparatus and a method for a three-dimensional (3D) broadcasting service that may provide a 3D broadcasting service in a broadcasting system where a fixed broadcasting service and a mobile broadcasting service are combined.

An aspect of the present invention also provides an apparatus and a method for a 3D broadcasting service including a transmitter that may transmit, using a fixed broadcasting, one of a left image and a right image constituting a 3D image, and transmit, using a mobile broadcasting, a remaining image of the left image and the right image that is not transmitted by the fixed broadcasting.

An aspect of the present invention also provides an apparatus and a method for a 3D broadcasting service including a receiver that may receive, using a fixed broadcasting, one of a left image and a right image constituting a 3D image, and receive, using a mobile broadcasting, a remaining image of the left image and the right image that is not transmitted by the fixed broadcasting.

An aspect of the present invention also provides an apparatus and a method for a 3D broadcasting service that may provide a 3D broadcasting service by composing an image received using the fixed broadcasting and an image received using the mobile broadcasting.

Technical Solutions

According to an aspect of the present invention, there is provided a three-dimensional (3D) broadcasting service apparatus including a transmitter that may allocate, to a fixed broadcasting signal, one of a left image and a right image constituting a 3D image, allocate, to a mobile broadcasting signal, an unallocated image of the left image and the right image, and broadcast a broadcasting signal including side information for the fixed broadcasting signal, the mobile broadcasting signal, and a 3D image composition, and a receiver that may extract the fixed broadcasting signal, the mobile broadcasting signal, and the side information from the broadcasting signal when the broadcasting signal is received, and provide a two-dimensional (2D) fixed broadcasting service using the fixed broadcasting signal, a 2D mobile broadcasting service using the mobile broadcasting signal, or a 3D broadcasting service by composing an image received using the fixed broadcasting signal and an image received using the mobile broadcasting signal into a 3D image using the side information.

Effect of the Invention

According to embodiments of the present invention, there may be provided an apparatus and a method for providing a two-dimensional (2D) fixed broadcasting service using a fixed broadcasting signal or for providing a 2D mobile broadcasting using a mobile broadcasting signal when a transmitter transmits each of a left image and a right image constituting a 3D image using the fixed broadcasting signal or using the mobile broadcasting signal, and the receiver receives the fixed broadcasting signal and the mobile broadcasting signal. Also, according to embodiments of the present invention, there may be provided an apparatus and a method for providing a three-dimensional (3D) broadcasting service by composing, into a 3D image, an image received using the fixed broadcasting and an image received using the mobile broadcasting. The fixed broadcasting signal and the mobile broadcasting signal may separately support a 2D broadcasting service and a 3D broadcasting service by composing the fixed broadcasting signal and the mobile broadcasting signal, and thereby transmission efficiency may increase.

BEST MODE FOR CARRYING OUT THE INVENTION

Figure 1:
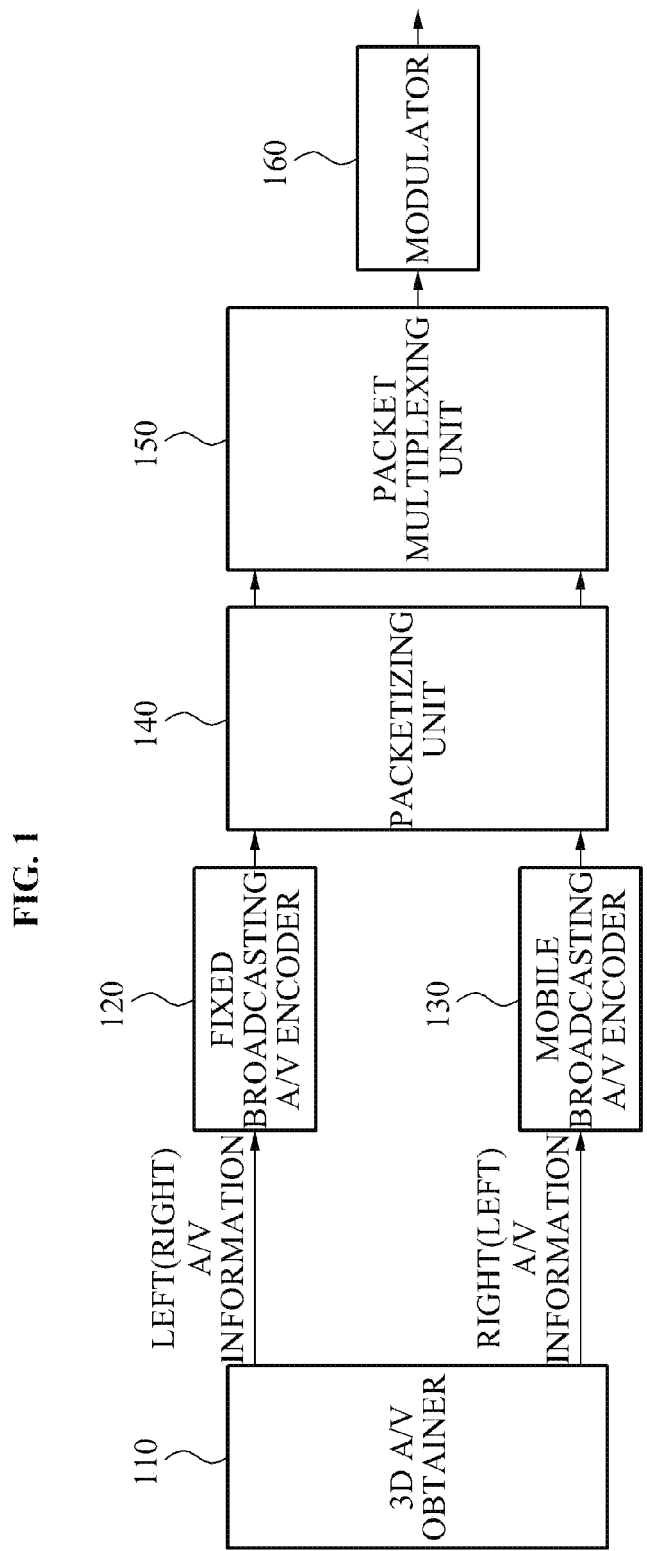
FIG. 1 is a diagram illustrating a structure of a transmitter that may transmit a three-dimensional (3D) broadcasting in a 3D broadcasting service apparatus according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

According to an embodiment of the present invention, there is provided an apparatus and a method for providing a three-dimensional (3D) broadcasting service that may provide a two-dimensional (2D) fixed broadcasting service using a fixed broadcasting signal or a 2D mobile broadcasting using a mobile broadcasting signal when each of a left image and a right image constituting a 3D image is transmitted using the fixed broadcasting signal or the mobile broadcasting signal, and the fixed broadcasting signal and the mobile broadcasting signal are received, or that may provide a 3D broadcasting service by composing an image received using the fixed broadcasting and an image received using the mobile broadcasting into a 3D image.

FIG. 1 is a diagram illustrating a structure of a transmitter that may transmit a 3D broadcasting in a 3D broadcasting service apparatus according to an embodiment of the present invention.

Referring to FIG. 1, the transmitter may include a 3D audio and video (A/V) obtainer 110, a fixed broadcasting A/V encoder 120, a mobile broadcasting A/V encoder 130, a packetizing unit 140, a packet multiplexing unit 150, and a modulator 160.

The 3D A/V obtainer 110 may obtain a 3D image and an audio signal necessary for the 3D broadcasting. The 3D image may be classified into a left image and a right image for a 3D effect, and may be shot with a 3D camera having two cameras.

The 3D A/V obtainer 110 may transmit, to the fixed broadcasting A/V encoder 120, one of a left image and a right image constituting a 3D image, and an audio signal using a fixed broadcasting signal. The 3D A/V obtainer 100 may transmit, to the mobile broadcasting A/V encoder 130, a remaining image of the left image and the right image, and the audio signal using a mobile broadcasting signal.

The fixed broadcasting A/V encoder 120 may compress and encode the audio signal and the image of the fixed broadcasting signal received from the 3D A/V obtainer 110 and thereby transmit a resulting audio signal and image to the packetizing unit 140.

The mobile broadcasting A/V encoder 130 may compress and encode the audio signal and the image of the mobile broadcasting signal received from the 3D A/V obtainer 110, and transmit a resulting audio signal and image to the packetizing unit 140.

The packetizing unit 140 may insert side information for a 3D image composition into the encoded fixed broadcasting signal or the encoded mobile broadcasting signal, and packetize a resulting signal in order to transmit a resulting signal packet to a packetized elementary stream (PES), a transport stream (TS), an Internet Protocol (IP), and the like, and transmit the resulting signal packet to the packet multiplexing unit 150.

The packet multiplexing unit 150 may multiplex the fixed broadcasting signal packet and the mobile broadcasting signal packet, and transmit the multiplexed packets to the modulator 160.

The modulator 160 may modulate the multiplexed packet and broadcast the modulated multiplexed packet using a broadcasting signal.

Figure 2:
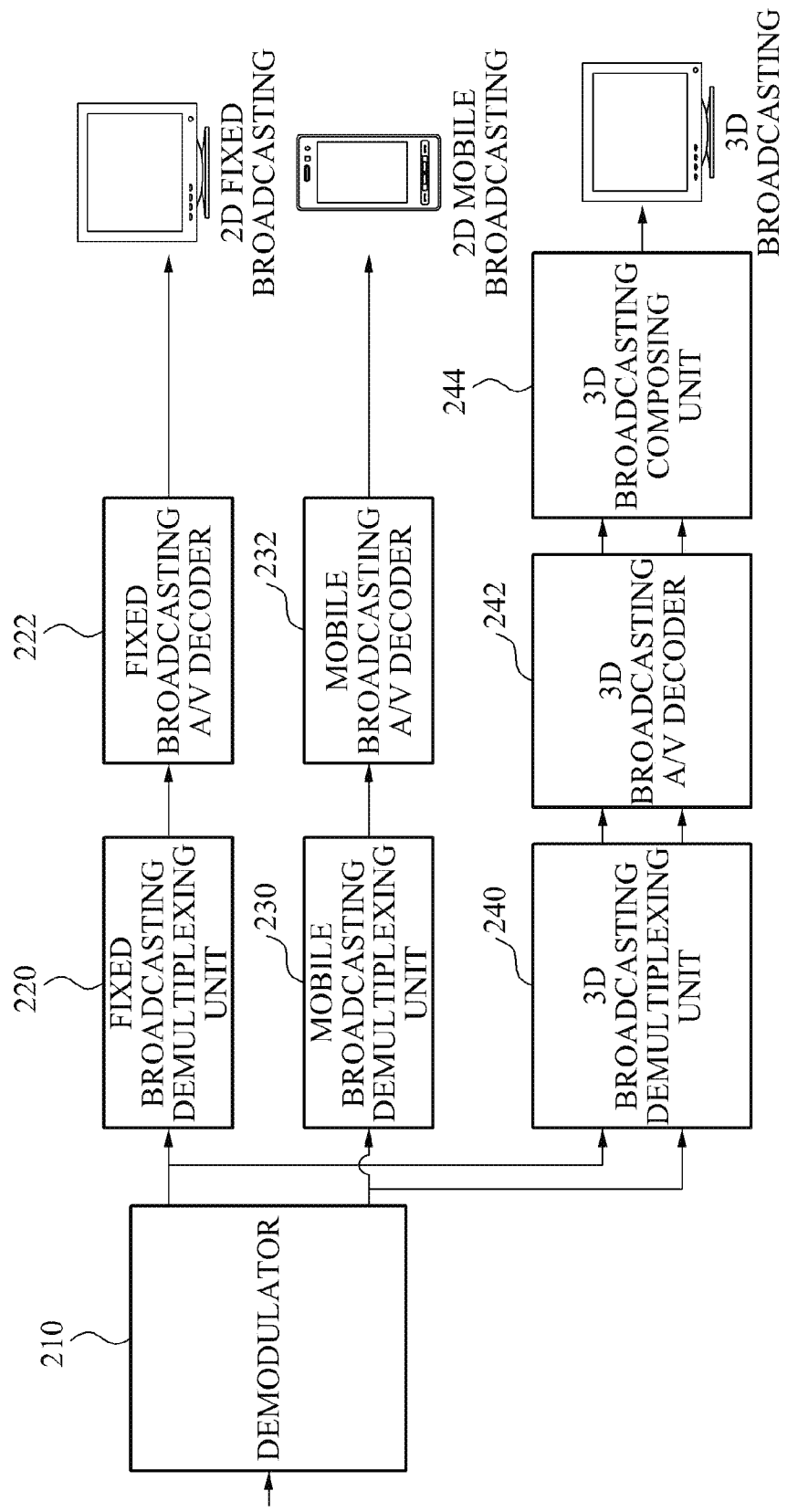
FIG. 2 is a diagram illustrating a structure of a receiver that may receive a 3D broadcasting in a 3D broadcasting service apparatus according to an embodiment of the present invention.

FIG. 2 is a diagram illustrating a structure of a receiver that may receive a 3D broadcasting in a 3D broadcasting service apparatus according to an embodiment of the present invention.

Referring to FIG. 2, the receiver may include a demodulator 210, a fixed broadcasting demultiplexing unit 220, a fixed broadcasting A/V decoder 222, a mobile broadcasting demultiplexing unit 230, a mobile broadcasting A/V decoder 232, a 3D broadcasting demultiplexing unit 240, a 3D broadcasting A/V decoder 242, and a 3D composing unit 244.

The demodulator 210 may demodulate a broadcasting signal when the broadcasting signal that the transmitter broadcasts is received.

The fixed broadcasting demultiplexing unit 220 may demultiplex the demodulated broadcasting signal and extract a fixed broadcasting signal and transmit the extracted fixed broadcasting signal to the fixed broadcasting A/V decoder 222.

The fixed broadcasting A/V decoder 222 may decode an audio signal and an image signal that are included in the fixed broadcasting signal, and output the decoded signals as a 2D fixed broadcast. In this instance, the image signal included in the fixed broadcasting signal may correspond to one of a left image and a right image constituting a 3D image.

The mobile broadcasting demultiplexing unit 230 may demultiplex the demodulated broadcasting signal and extract a mobile broadcasting signal, and transmit the extracted mobile broadcasting signal to the mobile broadcasting A/V decoder 232.

The mobile broadcasting A/V decoder 232 may decode an audio signal and an image signal that are included in the mobile broadcasting signal, and output the decoded signals as a 2D mobile broadcast. In this instance, the image signal included in the mobile broadcasting signal may correspond to one of a left image and a right image constituting a 3D image, which may be different from an image included in the fixed broadcasting signal. That is, when the left image is included in the fixed broadcasting signal, the right image may be included in the mobile broadcasting signal.

The 3D broadcasting demultiplexing unit 240 may demultiplex the demodulated broadcasting signal and extract side information for a fixed broadcasting signal, a mobile broadcasting signal, and a 3D image composition.

The 3D broadcasting A/V decoder 242 may decode an audio signal and an image signal that are included in the fixed broadcasting signal and the mobile broadcasting signal. In this instance, the fixed broadcasting signal and the mobile broadcasting signal may respectively include one of a left image and a right image constituting a 3D image, and the images that are included in the fixed broadcasting signal and the mobile broadcasting signal may be different from each other.

The 3D composing unit 244 may compose an image received using the fixed broadcasting signal and an image received using the mobile broadcasting signal into a 3D image using the side information, and output the 3D image and the audio signal as a 3D broadcast.

The broadcasting system of the present invention is a broadcasting system where a fixed mobile service and a mobile broadcasting service are combined. As examples where a fixed broadcasting service and a mobile broadcasting service are combined, there may be applicable combinations, such as a combination of a fixed broadcasting using an 8-vestigial side band (8-VSB) and a mobile broadcasting using an Advance Television Systems Committee (ATSC)—Mobile/Handheld (M/H), a combination of a fixed broadcasting using a Digital Video Broadcasting-Terrestrial (DVB-T) and a mobile broadcasting using a Digital Video Broadcasting-Handheld (DVB-H), and a combination a fixed broadcasting signal using an Integrated Service Digital Broadcasting-Terrestrial (ISDB-T) and a mobile broadcasting using an one-seg, and the like.

The exemplary embodiments according to the present invention may be recorded in non-transitory computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A transmitter of a broadcasting system, the transmitter comprising: a fixed broadcasting A/V encoder configured to generate a fixed broadcasting signal by encoding a first image signal for a 3D image;
   a mobile broadcasting A/V encoder configured to generate a mobile broadcasting signal by encoding a second image signal for a 3D image;
   a packetizing unit to generate a fixed broadcasting signal packet by packetizing the fixed broadcasting signal, and a mobile broadcasting signal packet by packetizing the mobile broadcasting signal, wherein a side information for the first image or the second image signal for the 3D image is inserted into either the fixed broadcasting signal or the mobile broadcasting signal, and
   a packet multiplexing unit configured to multiplex the fixed broadcasting signal packet and the mobile broadcasting signal packet,
   wherein the fixed broadcasting signal is transmitted to a receiver of a broadcasting system using a fixed broadcasting, and the mobile broadcasting signal is transmitted to a receiver of a broadcasting system using a mobile broadcasting,
   wherein the first image signal corresponds to one of a left image and a right image constituting the first image or the second image signal for the 3D image, the second image signal corresponds to the right image when the first image signal corresponds to the left image, and the second image signal corresponds to the left image when the first image signal corresponds to the right image,
   wherein the side information is used to compose the first image signal derived from the fixed broadcasting signal and the second image signal derived from the mobile broadcasting signal for the first image or the second image signal for the 3D image, and
   wherein images included in the first image signal included in the fixed broadcasting signal is different from images included in the second image signal included in the mobile broadcasting signal.

2. A receiver of a broadcasting system, the receiver comprising:
   a fixed broadcasting demultiplexing unit to demultiplex and extract a fixed broadcasting signal in a fixed broadcasting; and
   a fixed broadcasting audio and video (A/V) decoder to decode a first image signal in the fixed broadcasting signal;
   a mobile broadcasting demultiplexing unit to demultiplex and extract a mobile broadcasting signal in a mobile broadcasting;
   a mobile broadcasting audio and video (A/V) decoder to decode a second image signal in the mobile broadcasting signal; and
   a 3D composing unit configured for composing the first image signal derived from the fixed broadcasting signal and the second image signal derived from the mobile broadcasting signal for the 3D image based on a side information,
   wherein the side information is extracted from either the fixed broadcasting signal, or the mobile broadcasting signal, and
   wherein the first image signal corresponds to one of a left image and a right image constituting a 3D image, a second image signal included in the mobile broadcasting signal corresponds to the right image when the first image signal corresponds to the left image, and the second image signal included in the mobile broadcasting signal corresponds to the left image when the first image signal corresponds to the right image, and
   wherein images included in the first image signal included in the fixed broadcasting signal is different from images included in the second image signal included in the mobile broadcasting signal.

3. A method of providing a three-dimensional (3D) broadcasting service in a transmitter of a broadcasting system, the method comprising:
   generating a fixed broadcasting signal by encoding a first image signal for a 3D image;
   generating a mobile broadcasting signal by encoding a second image signal for a 3D image;
   generating a fixed broadcasting signal packet by packetizing the fixed broadcasting signal, and a mobile broadcasting signal packet by packetizing the mobile broadcasting signal, wherein a side information for the first image or the second image signal for the 3D image is inserted into either the fixed broadcasting signal or the mobile broadcasting signal, and
   multiplexing the fixed broadcasting signal packet and the mobile broadcasting signal packet,
   wherein the fixed broadcasting signal is transmitted to a receiver of a broadcasting system using a fixed broadcasting, and the mobile broadcasting signal is transmitted to a receiver of a broadcasting system using a mobile broadcasting,
   wherein the first image signal corresponds to one of a left image and a right image constituting the first image or the second image signal for the 3D image, the second image signal corresponds to the right image when the first image signal corresponds to the left image, and the second image signal corresponds to the left image when the first image signal corresponds to the right image,
   wherein the side information is used to compose the first image signal derived from the fixed broadcasting signal and the second image signal derived from the mobile broadcasting signal for the first image or the second image signal for the 3D image, and
   wherein images included in the first image signal included in the fixed broadcasting signal is different from images included in the second image signal included in the mobile broadcasting signal.

4. A method of providing a three-dimensional (3D) broadcasting service in a receiver of a broadcasting system, the method comprising:
   demultiplexing and extracting a fixed broadcasting signal in a fixed broadcasting; and
   decoding a first image signal in the fixed broadcasting signal;
   demultiplexing and extracting a mobile broadcasting signal in a mobile broadcasting;

decoding a second image signal in the mobile broadcasting signal; and composing the first image signal derived from the fixed broadcasting signal and the second image signal derived from the mobile broadcasting signal for the 3D image based on a side information, wherein the side information is extracted from either the fixed broadcasting signal, or the mobile broadcasting signal, and wherein the first image signal corresponds to one of a left image and a right image constituting a 3D image, a second image signal included in the mobile broadcasting signal corresponds to the right image when the first image signal corresponds to the left image, and the second image signal included in the mobile broadcasting signal corresponds to the left image when the first image signal corresponds to the right image, and wherein images included in the first image signal included in the fixed broadcasting signal is different from images included in the second image signal included in the mobile broadcasting signal.

5. A method of providing a three-dimensional (3D) broadcasting service, the method comprising:

coding and compressing one image for a 2D fixed broadcasting service;

coding and compressing the other image for a 2D mobile broadcasting service;

generating a first packet for the coded one image based on a transport stream; and generating a second packet for the coded the other image based on an internet protocol;

wherein the first packet is transmitted via the 2D fixed broadcasting service, and the second packet is transmitted via the 2D mobile broadcasting service, wherein one image for the 2D fixed broadcasting service is different from the other image for the 2D mobile broadcasting service, wherein the other image is right image for a 3D broadcasting service, if one image is left image for the 3D broadcasting service, and wherein the other image is left image for the 3D broadcasting service, if one image is right image for the 3D broadcasting service, and wherein a side information for 3D image composition based on one image and the other image is transmitted over 2D fixed broadcasting.

\* \* \* \* \*